(12) United States Patent
Gibson

(10) Patent No.: US 8,289,989 B1
(45) Date of Patent: Oct. 16, 2012

(54) SYSTEM AND METHOD FOR ARBITRATION USING AVAILABILITY SIGNALS

(75) Inventor: David Gibson, Suwanee, GA (US)

(73) Assignee: Integrated Device Technology Inc., San Jose, CA (US)

( * ) Notice: Subject to any disclaimer, the term of this patent is extended or adjusted under 35 U.S.C. 154(b) by 1182 days.

(21) Appl. No.: 11/419,572

(22) Filed: May 22, 2006

(51) Int. Cl.
*H04J 3/02* (2006.01)
(52) U.S. Cl. ....................................... 370/462
(58) Field of Classification Search .................. 370/389, 370/411, 299, 395.4, 462
See application file for complete search history.

(56) References Cited

U.S. PATENT DOCUMENTS

| | | | |
|---|---|---|---|
| 5,301,055 A | 4/1994 | Bagchi et al. | |
| 5,784,003 A | 7/1998 | Dahlgren | |
| 5,787,084 A | 7/1998 | Hoang et al. | |
| 5,862,137 A | 1/1999 | Manning | |
| 5,956,342 A | 9/1999 | Manning | |
| 6,208,644 B1 * | 3/2001 | Pannell et al. | 370/389 |
| 6,629,176 B1 | 9/2003 | Rhee | |
| 6,772,256 B1 | 8/2004 | Regev | |
| 6,963,576 B1 * | 11/2005 | Lee | 370/411 |
| 7,352,741 B2 * | 4/2008 | Eberle et al. | 370/389 |
| 7,391,787 B1 | 6/2008 | McCrosky | |
| 7,519,065 B2 * | 4/2009 | Angle et al. | 370/395.4 |
| 2004/0081108 A1 * | 4/2004 | Kloth et al. | 370/299 |
| 2005/0278510 A1 | 12/2005 | Jacobs et al. | |

* cited by examiner

*Primary Examiner* — Anh-Vu Ly
*Assistant Examiner* — Gbemileke Onamuti
(74) *Attorney, Agent, or Firm* — Kenneth Glass; Stanley J. Pawlik; Glass & Associates

(57) ABSTRACT

A packet switch includes an arbiter that generates an availability signal indicating whether one or more pseudo-ports are available for receiving data. Each pseudo-port identifies one or more output ports of the packet switch. An input port of the packet switch receives data of a data packet, generates a grant request identifying a pseudo-port, and issues the grant request to a grant request filter. The grant request filter determines based on the availability signal whether the grant request is serviceable by the packet switch. If the grant request is a serviceable grant request, the grant request filter issues the grant request to the arbiter. The arbiter can select the serviceable grant request and issue a grant to the input port. The data of the data packet can then be routed from the input port to each output port identified by the pseudo-port.

18 Claims, 5 Drawing Sheets

SYSTEM AND METHOD FOR ARBITRATION USING AVAILABILITY SIGNALS

CROSS-REFERENCE TO RELATED APPLICATION

The present application is related to co-pending U.S. patent application Ser. No. 11/383,165, filed May 12, 2006, entitled "Packet Processing in a Packet Switch with Improved Output Data Distribution," which is incorporated herein by reference in its entirety.

BACKGROUND

1. Field of the Invention

The present invention generally relates to packet switches, and more particularly to performing arbitration in a packet switch.

2. Description of Related Art

Modern telecommunication networks include packet switching networks for transmitting data from a source device to a destination device. The packet switching network routes data packets through a network of interconnected packet switches based on destination addresses in the data packets. An individual packet switch in the packet switching network routes data packets from input ports to output ports of the packet switch.

Because the packet switch may receive multiple data packets at the input ports that are destined for the same output port, the packet switch often includes an arbiter that determines an order for routing data packets through the packet switch. The input ports of the packet switch issue grant requests to the arbiter for routing data contained in data packets to the output ports. The arbiter then determines whether the output port identified by each grant request is available to receive data. If an output port identified by a grant request is available to receive data, the arbiter selects a grant request that identifies the output port and issues a grant to the input port that issued the selected grant request. The packet switch then routes data contained in a data packet of each input port that received a grant to the output port identified by the selected grant request issued by the input port.

The arbiter may also receive a grant request for routing a data packet from an input port to multiple output ports. The grant request typically includes a destination address that identifies a multicast group containing the multiple output ports. The arbiter determines whether each output port of the multicast group is available to receive data of the data packet. If each output port of the multicast group is available, the arbiter can select the grant request and issue a grant to the input port that issued the selected grant request. The packet switch then routes the data of the data packet to each output port of the multicast group. Determining whether each output port of the multicast group is available to receive data of a data packet is a time consuming process, which may affect the performance of the packet switch.

In light of the above, a need exists for reducing the time required for an arbiter to select a data packet for routing through a packet switch. A further need exists for reducing the time required for an arbiter to determine whether multiple output ports of a packet switch are available to receive data of a data packet.

SUMMARY

In various embodiments, a packet switch includes an arbiter that generates an availability signal indicating whether one or more pseudo-ports are available for receiving data. Each pseudo-port identifies one or more output ports of the packet switch. A pseudo-port is available if each output port identified by the pseudo-port is available to receive data. An input port of the packet switch receives a data packet, generates a grant request identifying a pseudo-port, and issues the grant request to a grant request filter. The grant request filter determines based on the availability signal whether the grant request is serviceable by the packet switch. The grant request is serviceable by the packet switch if the pseudo-port identified by the grant request is available. If the grant request is a serviceable grant request, the grant request filter issues the grant request to the arbiter. The arbiter can then select the serviceable grant request. Because the availability signal indicates whether each pseudo-port is available, the arbiter can quickly determine whether a grant request is serviceable. Moreover, the arbiter can generate the availability signal and the input port can generate the grant request substantially in parallel with each other.

A method for arbitration in a packet switch, in accordance with one embodiment, includes generating in a first clock cycle an availability signal indicating at least one pseudo-port available in a second clock cycle following the first clock cycle. Each pseudo-port identifies output ports of the packet switch and is available if each of the identified output ports is available to receive data in the second clock cycle. The method also includes receiving at least one grant request identifying a pseudo-port from input ports of the packet switch. Further, the method includes identifying at least one grant request serviceable in the second clock cycle as a serviceable grant request based on the availability signal. Additionally, the method includes selecting a serviceable grant.

A system for arbitration in a packet switch, in accordance with one embodiment, includes an arbiter and at least one grant request filter coupled to the arbiter. The arbiter generates an availability signal in a first clock cycle. The availability signal indicates at least one pseudo-port available in a second clock cycle following the first clock cycle. Each pseudo-port identifies output ports of the packet switch and is available if each output port identified by the pseudo-port is available to receive data in the second clock cycle. At least one grant request filter receives at least one grant request identifying a pseudo-port from input ports of the packet switch. At least one grant request filter identifies at least one grant request serviceable in the second clock cycle as a serviceable grant request based on the availability signal. The arbiter selects a serviceable grant request.

A system for arbitration in a packet switch, in accordance with one embodiment, includes a means for generating in a first clock cycle an availability signal indicating at least one pseudo-port available in a second clock cycle following the first clock cycle. Each pseudo-port identifies output ports of the packet switch and is available if each of the identified output ports is available to receive data in the second clock cycle. The system further includes a means for receiving at least one grant request identifying a pseudo-port from input ports of the packet switch. Additionally, the system includes a means for identifying at least one grant request serviceable in the second clock cycle as a serviceable grant request based on the availability signal and a means for selecting a serviceable grant request.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, an arbitration system for a packet switch includes an arbiter and grant request filters. The grant request filters receive grant requests from input ports of the packet switch for routing data packets through the packet switch. Each grant request identifies a pseudo-port. In a current clock cycle, the arbiter generates an availability signal identifying any pseudo-ports available in a subsequent clock cycle. Each pseudo-port identifies one or more output ports that are available to receive data in the subsequent clock cycle. The grant request filters identify grant requests received from the input ports that are serviceable by the packet switch in the subsequent cycle based on the availability signal. The arbiter selects one or more of the serviceable grant requests in the subsequent clock cycle and issues a grant to each input port that generated a selected grant request. The packet switch can then route data of a data packet from each input port that generated a selected grant request to each output port of the pseudo-port identified by the selected grant request.

Figure 1:
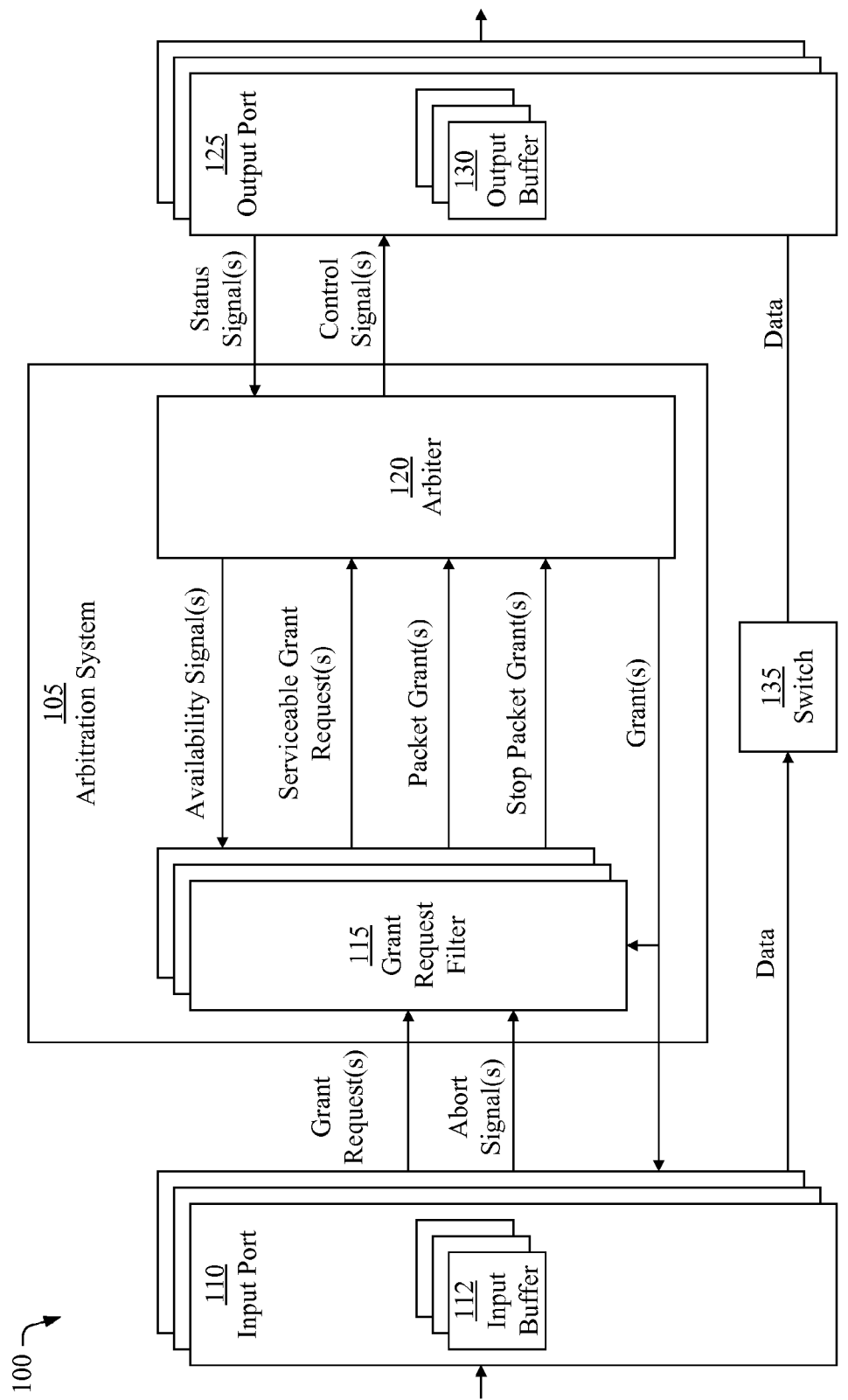
FIG. 1 is a block diagram of a packet switch including an arbitration system, in accordance with an embodiment of the present invention.

FIG. 1 illustrates a packet switch 100, in accordance with an embodiment of the present invention. The packet switch 100 includes input ports 110, an arbitration system 105, output ports 125, and a switch 135. The arbitration system 105 includes grant request filters 115 and an arbiter 120. Each grant request filter 115 is coupled to a corresponding input port 110 and to the arbiter 120. Additionally, the arbiter 120 and the switch 135 are each coupled to each input port 110 and to each output port 125.

Each input port 110 includes one or more input buffers 112 for storing data. In some embodiments, each input buffer 112 has a priority and stores data packets having the priority of the input buffer 112. In other embodiments, the input port 110 stores data packets having different priorities into the same input buffer 112. Each output port 125 includes one or more output buffers 130 for storing data. In some embodiments, each output buffer 130 has a priority and stores data packets having the priority of the output buffer 130. In other embodiments, the output port 125 stores data packets having different priorities into the same output buffer 130.

In one embodiment, each input port 110 can receive data of a data packet and can issue a grant request to the grant request filter 115 that corresponds to the input port 110. The grant request includes a pseudo-port identifier, which identifies a pseudo-port. A pseudo-port identifies one or more output ports 125 of the packet switch 100. In addition to the grant request received from the input port 110, the grant request filter 115 receives an availability signal from the arbiter 120. The arbiter 120 generates the availability signal in a current clock cycle based on a status signal received from the output ports 125. The status signal indicates the amount of data stored in each of the output ports 125. The availability signal indicates whether each pseudo-port is available in a subsequent clock cycle. A pseudo-port is available in the subsequent clock cycle if each output port 125 of the pseudo-port (e.g., each output port 125 identified by the pseudo-port) is available to receive data in the subsequent clock cycle.

In some embodiments, a pseudo-port may also identify one or more characteristics that determine whether each output port 125 of the pseudo-port is available. In one embodiment, a characteristic of a pseudo-port is a priority. In this embodiment, an output port 125 of the pseudo-port is available if the output port 125 is available to receive, in the subsequent clock cycle, data having the priority of the pseudo-port (e.g., the priority identified by the pseudo-port).

In a further embodiment, each output port 125 includes a plurality of output buffers 130, each of which has a priority. Each of the output buffers 130 can store data having a priority that is the same as the priority of the output buffer 130. Moreover, a pseudo-port can identify one or more output ports 125 as well as a priority. In this embodiment, each output port 125 of the pseudo-port is available if the output buffer 130 having the priority in the output port 125 is available to receive data in the subsequent clock cycle.

In embodiments in which a pseudo-port identifies a characteristic, multiple pseudo-ports can identify the same output ports 125 if each of the multiple pseudo-ports identifies a different characteristic of the output ports 125. For example, multiple pseudo-ports that identify the same output ports 125 can each identify a different priority. In this way, each of the multiple pseudo-ports can identify different output buffers 130 in the output ports 125 of the pseudo-port based on the priority of the pseudo-port.

In one embodiment, the status signal indicates the amount of data stored in each of the output buffers 130. For example, the status signal may indicate whether each output buffer 130 of each output port 125 has the capacity to store data in a subsequent clock signal. In one embodiment, the status signal indicates whether each of the output buffers 130 has the capacity to store, in the subsequent clock cycle, a maximum-sized data packet having the priority of the output buffer 130.

In various embodiments, the status signal may indicate if each output buffer 130 is full, almost full, or both. In some embodiments, an output buffer 130 is deemed full if the output buffer 130 does not have the capacity to store a maximum-sized data packet in a subsequent clock cycle following the current clock cycle. In addition, the output buffer 130 is deemed almost full if the output buffer 130 has the capacity to store a maximum-sized data packet in the subsequent clock cycle, but does not have the capacity to store the maximum-sized data packet and one or more additional data words in the subsequent clock cycle.

The grant request filter 115 determines whether a grant request is serviceable by the switch 135 in the subsequent clock cycle based on the availability signal received from the arbiter 120. The grant request can be serviced in the subsequent clock cycle if the switch 135 can route data from an input port 110 identified by the grant request to each output buffer 130 of a pseudo-port identified by the grant request. If the grant request is a serviceable, the grant request filter 115 issues the grant request to the arbiter 120 as a serviceable grant request. In this way, the grant request filter 115 filters grant requests received from the input port 110 such that the arbiter 120 receives those grant requests that are serviceable grant requests.

In the subsequent clock cycle, the arbiter 120 selects one or more of the serviceable grant requests received from the grant request filters 115 and issues a grant to each input port 110 that issued a selected grant request. Additionally, the arbiter 120 issues a grant to the grant request filter 115 corresponding to the input port 110 that issued the selected grant request. In response to the grant, the input port 110 sends data of a data packet to the switch 135, and the switch 135 routes the data to each output port 125 of the pseudo-port identified by the selected grant request. In turn, each output port 125 of the pseudo-port stores the data.

In one embodiment, the switch 135 routes the data to each output buffer 130 of each output port 125, and the arbiter 120 provides a control signal to each output port 125 of the pseudo-port. In turn, each output port 125 of the pseudo-port stores the data in an output buffer 130 of the output port 125 based on the control signal. In various embodiments, the data is a data word of a data packet contained in an input buffer 112 of the input port 110. The data word can contain any number of data bits such as, for example, thirty-two data bits.

In a further embodiment, a grant request filter 115 that received a grant from the arbiter 120 can issue a packet grant to the arbiter 120 for routing a data packet. The packet grant identifies the input port 110 corresponding to the grant request filter 115 and the pseudo-port identified by the grant request issued by the input port 110. In response to the packet grant, the arbiter 120 updates the availability signal to indicate that the pseudo-port identified by the packet grant is not available. In this way, the pseudo-port identified by the packet grant is reserved for the input port 110 identified by the packet grant. If a packet grant is outstanding for the input port 110 (e.g., the packet grant has not been relinquished), the grant request filter 115 can issue a subsequent grant request identifying the pseudo-port to the arbiter 120 as a serviceable grant request without first determining whether the grant request is serviceable.

After the switch 135 routes the last data word of the data packet to each output port 125 of the pseudo-port identified by the selected grant request, the grant request filter 115 issues a stop packet grant to the arbiter 120 indicating the packet grant is relinquished. In turn, the arbiter 120 updates the availability signal to indicate the pseudo-port identified by the packet grant is available. In this way, the packet grant reserves the pseudo-port identified by the packet grant for the input port 110 identified by the packet grant until the arbiter 120 receives the stop packet grant from the grant request filter 115.

In one embodiment, the input port 110 can provide an abort signal to the grant request filter 115 to abort routing of a data packet. In response to the abort signal, the grant request filter 115 issues a stop packet grant to the arbiter 120 to relinquish the packet grant. In turn, the arbiter 120 updates the availability signal to indicate that the pseudo-port identified by the packet grant is available. In this process, the arbiter 120 may also update the availability signal to indicate that other pseudo-ports have become available. In addition to providing the abort signal to the grant request filter 115, the input port 110 appends control information to data of the data packet indicating that any data of the data packet is to be discarded. The switch 135 routes the data containing the control information to each output port 125 of the pseudo-port identified by the packet grant. In turn, each output port 125 of the pseudo-port discards the data along with any other data of the data packet stored in the output port 125.

Although three input ports 110 and three input buffers 112 are illustrated in FIG. 1, the packet switch 100 can have more or fewer input ports 110, and each input port 110 can have more or fewer input buffers 112 in other embodiments. Although three output ports 125 and three output buffers 130 are shown in FIG. 1, the packet switch 100 can have more or fewer output ports 125 and each output port 125 can have more or fewer output buffers 130 in other embodiments.

Figure 2:
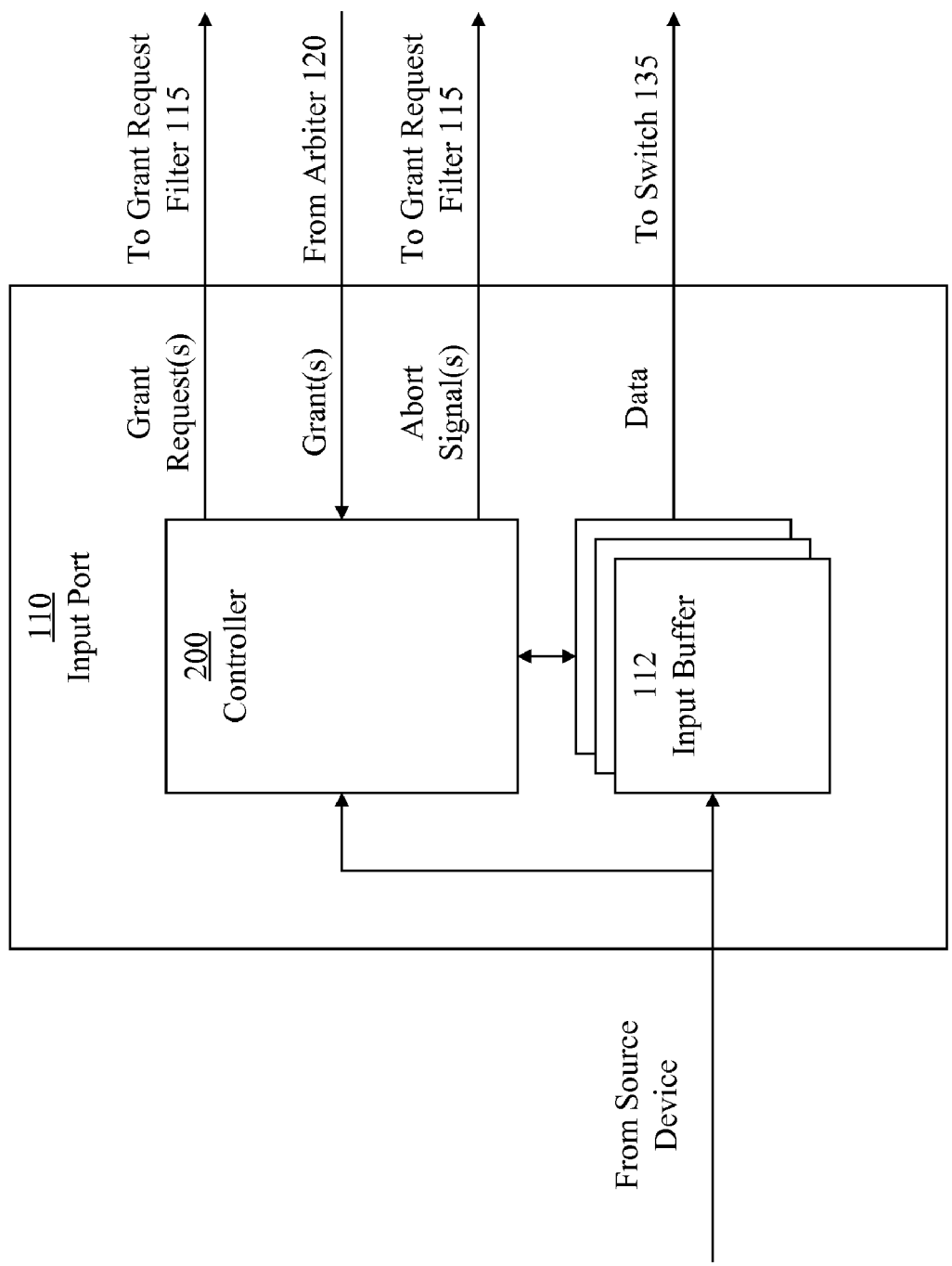
FIG. 2 is a block diagram of an input port, in accordance with an embodiment of the present invention.

FIG. 2 illustrates an input port 110, in accordance with an embodiment of the present invention. The input port 110 includes a controller 200 coupled to each input buffer 112. In operation, the input port 110 receives a data word of a data packet having a priority. The controller 200 identifies the priority of the data packet and provides a signal to the input buffer 112 having the priority of the data packet to write the data word of the data packet into the input buffer 112. In this way, data words having a given priority are stored in the input buffer 112 having that priority. Similarly, the controller 200 can write subsequent data words of the data packet into the input buffer 112 having the priority of the data packet. In this way, the controller 200 accumulates the data words of the data packet in the input buffer 112.

The controller 200 identifies the input buffer 112 having the highest priority that contains a data word of a data packet and issues a grant request to the grant request filter 115 (FIG. 1) corresponding to the input port 110 containing the data word. If the controller 200 receives a grant from the arbiter 120 in response to the grant request, the controller 200 provides a signal to the input buffer 112 having the highest priority. In turn, the input buffer 112 provides the data word to the switch 135 (FIG. 1) for routing the data word to each output port 125 (FIG. 1) of a pseudo-port identified by the grant request. In one embodiment, the input buffer 112 appends one or more data bits to the data word indicating control information for the data word. Each output port 125 of the pseudo-port can then process the data word based on the control bits. For example, the output port 125 can determine, based on the control bits, whether to store the data word, to ignore the data word, or to discard the data word along with any other data word associated with the data packet.

Figure 3:
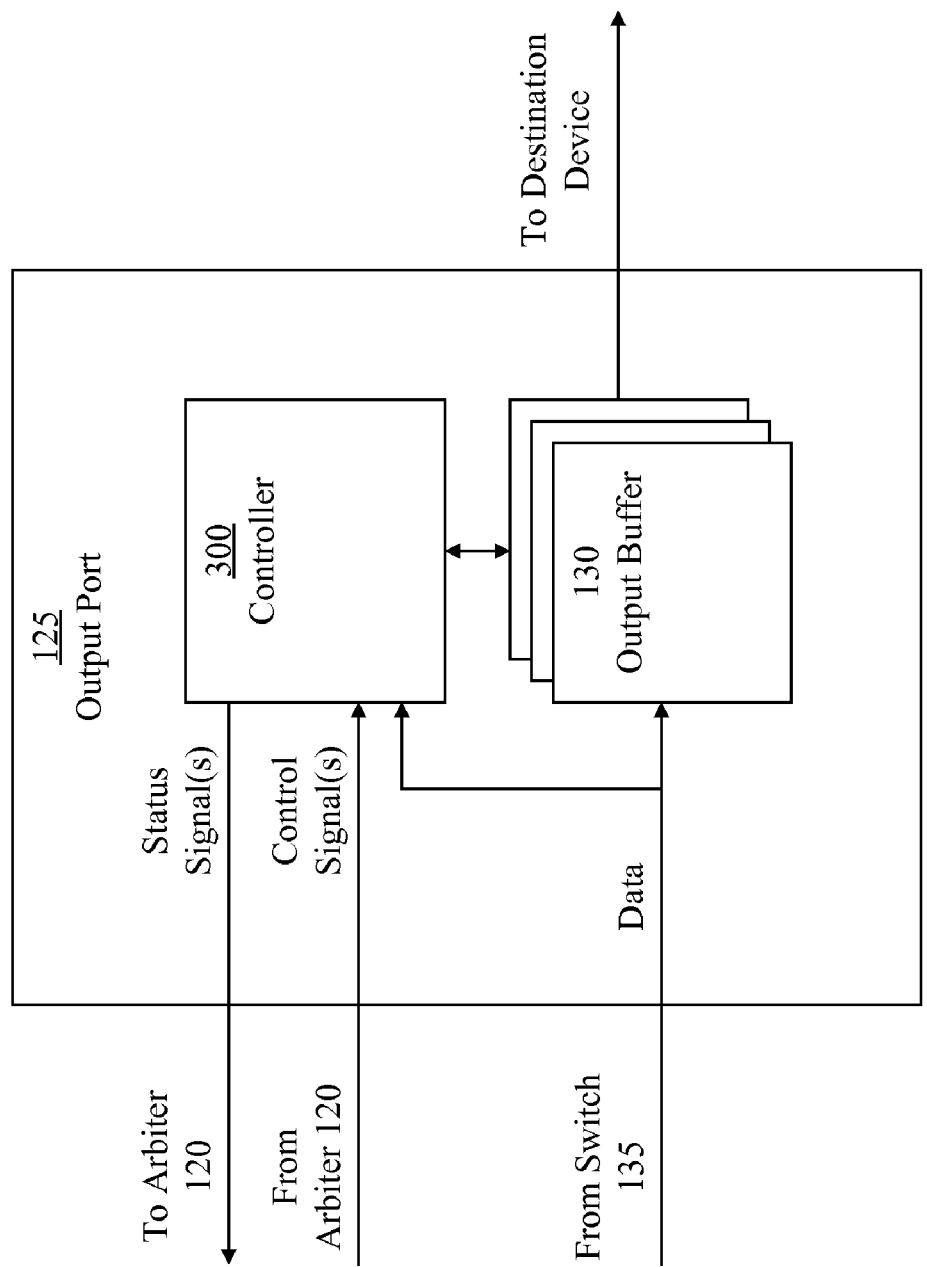
FIG. 3 is a block diagram of an output port, in accordance with an embodiment of the present invention.

FIG. 3 illustrates an output port 125, in accordance with an embodiment of the present invention. The output port 125 includes a controller 300 coupled to the arbiter 120 (FIG. 1) and to each output buffer 130. Further, each output port 125 is coupled to the switch 135 and may be coupled to a destination device (not shown). The controller 300 monitors each of the output buffers 130, generates a status signal in a current clock cycle, and provides the status signal to the arbiter 120. Additionally, the controller 300 can select one of the output buffers 130 containing a data word of a data packet and can provide a signal to the selected output buffer 130 to transmit the data word to the destination device (not shown) in the current clock cycle. For example, the output buffer 130 can be a first-in-first-out (FIFO) queue.

In one embodiment, the switch 135 (FIG. 1) provides a data word to each output buffer 130 in the output port 125 and the arbiter 120 provides a control signal to the controller 300 indicating which output buffer 130 is to store the data word. In response to the control signal, the controller 300 provides a signal to the output buffer 130 identified by the control signal to write the data word into the output buffer 130.

In one embodiment, the availability signal includes an availability indicator for each pseudo-port. The availability indicator indicates whether the pseudo-port associated with the availability indicator is available in a subsequent clock cycle following a current clock cycle. In this embodiment, a grant request filter 115 (FIG. 1) that receives a grant request can identify an availability indicator associated with a pseudo-port based on a pseudo-port identifier in the grant request. The grant request filter 115 determines whether the grant request is a serviceable grant request by determining whether the availability indicator identified by the pseudo-port identifier indicates the pseudo-port is available. If grant request filter 115 determines that the pseudo-port is available, the grant request filter 115 determines that the grant request is serviceable.

In one embodiment, the arbiter 120 generates an availability vector that includes an availability bit associated with each pseudo-port. Each availability bit indicates whether the pseudo-port associated with the availability bit is available in a subsequent clock cycle following a current clock cycle. For example, an availability bit may have a value of one to indicate the pseudo-port associated with the availability indictor is available or a value of zero to indicate that the pseudo-port is not available. The arbiter 120 may store the availability vector in a register or memory (not shown) of the arbitration system 105 (FIG. 1). In one embodiment, the availability signal represents the availability vector. For example, the availability signal may be a data bus including a data signal corresponding to each availability bit of the availability vector that indicates the value of the availability bit. In this way, the availability signal includes an availability indictor (e.g., a data signal) indicating whether each pseudo-port is available.

In a further embodiment, a pseudo-port is user-programmable. In this embodiment, a user can select one or more output ports 125 and program a pseudo-port to identify each of the selected output ports 125. A user can program a pseudo-port, for example, by storing data in a register or memory of the arbiter 120.

Figure 4:
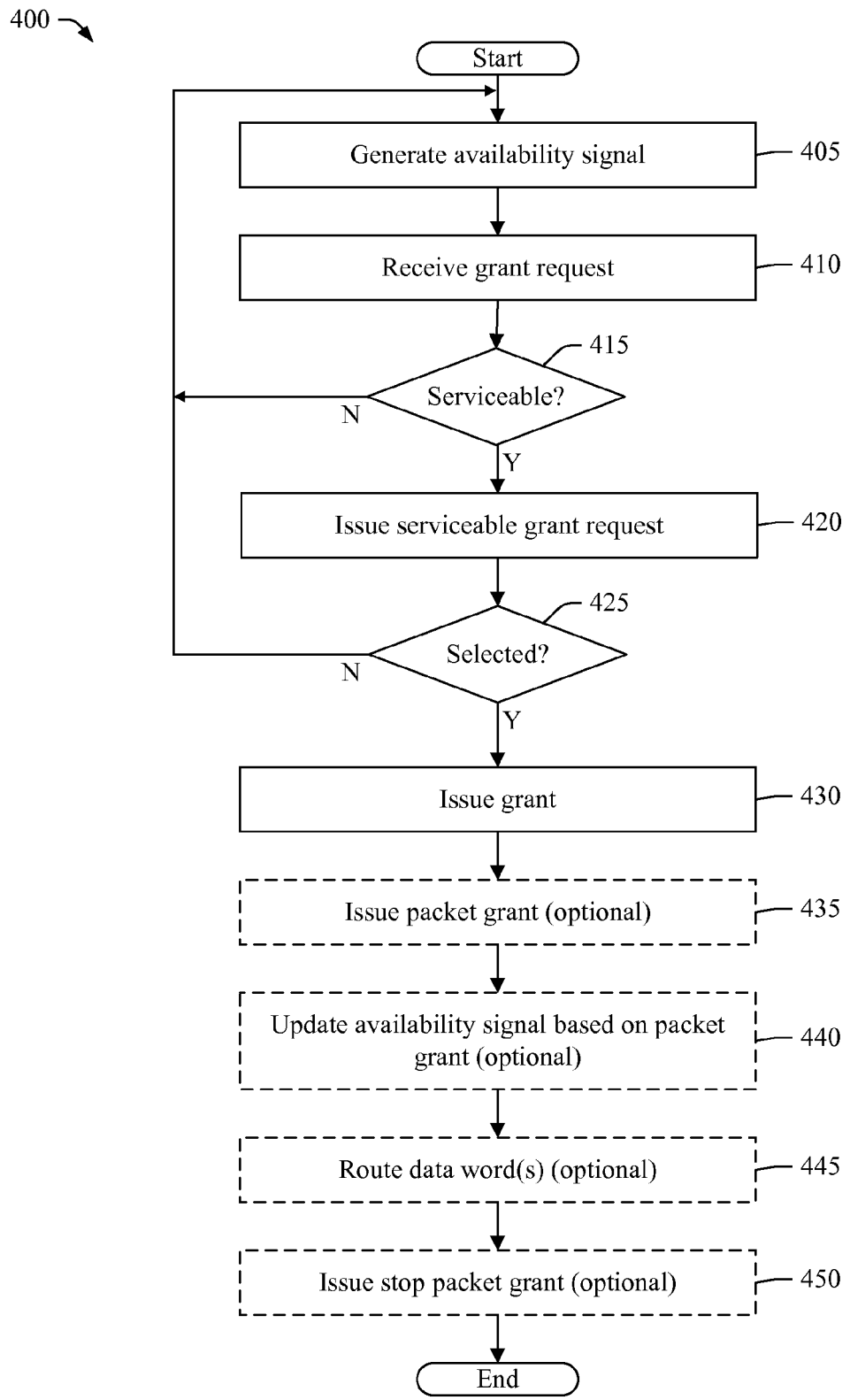
FIG. 4 is a flow chart of a method for arbitration in a packet switch, in accordance with an embodiment of the present invention.

FIG. 4 illustrates a method 400 for arbitration in the packet switch 100, in accordance with an embodiment of the present invention. In step 405, the arbiter 120 generates, in a current clock cycle, an availability signal identifying which pseudo-ports are available in a subsequent clock cycle. The method 400 then proceeds to step 410.

In step 410, a grant request filter 115 receives a grant request from the input port 110 corresponding to the grant request filter 115. The grant request identifies the input port 110 and a pseudo-port. The method 400 then proceeds to step 415.

In step 415 the grant request filter 115 determines whether the grant request is serviceable based on the availability signal. In one embodiment, the grant request filter 115 determines whether the grant request is serviceable by identifying a pseudo-port identifier in the grant request and identifying an availability indicator in the availability signal based on the pseudo-port identifier. The grant request filter 115 then determines whether the pseudo-port is available based on the availability indicator. If the pseudo-port is available, the grant request filter 115 determines that the grant request is serviceable. If the grant request is serviceable, the method 400 proceeds to step 420, otherwise the method 400 returns to step 405.

In step 420, arrived at from the determination in step 415 that the grant request is serviceable, the grant request filter 115 issues the grant request to the arbiter 120 as a serviceable grant request. The method 400 then proceeds to step 425.

In step 425, the arbiter 120 determines whether to select the serviceable grant request. The arbiter 120 can determine whether to select the serviceable grant request based on a selection algorithm. For example, the arbiter 120 can select the serviceable grant request based on a round robin algorithm. If the arbiter 120 selects the serviceable grant request, the method 400 proceeds to step 430, otherwise the method 400 returns to step 405.

In step 430, arrived at from the determination in step 425 that the arbiter 120 selected the serviceable grant request, the arbiter 120 issues a grant to the input port 110 that issued the selected grant request. Additionally, the arbiter 120 issues the grant to the grant request filter 115 corresponding to the input port 110. The method 400 then proceeds to step 435.

In optional step 435, the grant request filter 115 issues a packet grant to the arbiter 120 for routing a data packet. The packet grant identifies the input port 110 and the pseudo-port. The method 400 then proceeds to step 440.

In optional step 440, the arbiter 120 updates the availability signal based on the packet grant to indicate that the pseudo-port identified by the packet grant is not available. In this way, the pseudo-port is reserved for the input port 110 identified by the packet grant. Additionally, the arbiter 120 can update the availability signal to indicate that other pseudo-ports are not available. For example, the arbiter 120 can update the availability signal to indicate that another pseudo-port, which identifies an output port 125 of the pseudo-port identified by the packet grant, is not available. The method 400 then proceeds to step 445.

In optional step 445, the switch 135 routes data word(s) from the input port 110 to each output port 125 of the pseudo-port identified by the selected grant request. Each output port 125 of the pseudo-port stores the data word(s) into an output buffer 130 of the output port 125. In one embodiment, each output port 125 of the pseudo-port receives a control signal from the arbiter 120 indicating a priority. In this embodiment, the output port 125 stores each data word in an output buffer 130 of the output port 125 having the priority. Also in step 445, the output port 125 can transmit a data word stored in the output port 125 to a destination (not shown).

If the grant request filter 115 issued a packet grant to the arbiter 120 in step 435, the switch 135 can route an additional data word of the data packet to each output port 125 of the pseudo-port identified by the packet grant. In this process, the input port 110 issues a grant request for the additional data word of the data packet to the grant request filter 115. The grant request identifies the pseudo-port of the packet grant. The grant request filter 115 issues the grant request to the arbiter 120 as a serviceable grant request. The arbiter 120 selects the serviceable grant request and issues a grant to the input port 110 and the grant request filter 115. The switch 135 then routes the additional data word to the output ports 125 of the pseudo-port identified by the packet grant, and the output ports 125 store the additional data word. This process may be repeated for any additional data word of the data packet. The method 400 then proceeds to step 450.

In optional step 450, the grant request filter 115 issues a stop packet grant to the arbiter 120 to relinquish the packet grant. In turn, the arbiter 120 updates the availability signal to indicate that the pseudo-port identified by the packet grant is available. In this process, the arbiter 120 may also update the availability signal to indicate that other pseudo-ports have become available.

In one embodiment, the input port 110 can issue an abort signal to the grant request filter 115 to abort routing of a data packet. In response to the abort signal from the input port 110, the grant request filter 115 issues the stop packet grant to the arbiter 120 to relinquish the packet grant. In addition to providing the abort signal to the grant request filter 115, the input port 110 appends control information to data of the data packet indicating that any data of the data packet is to be discarded. The switch 135 routes the data containing the control information to each output port 125 of the pseudo-port. In turn, each output port 125 of the pseudo-port discards the data and any data of the data packet stored in the output port 125. The method 400 then ends. In an alternative embodiment, the method 400 returns to step 405 after step 450.

In other embodiments, the steps 405-450 of the method 400 may be performed in a different order. For example, the step may 410 may be performed before the step 405. In various embodiments, some of the steps 405-450 may be performed in parallel with each other. For example, the steps 405 and 410 may be performed in parallel. In some embodiments, the steps 405-450 may be performed at substantially the same time. For example, steps 405 and 410 may be performed substantially simultaneously.

Figure 5:
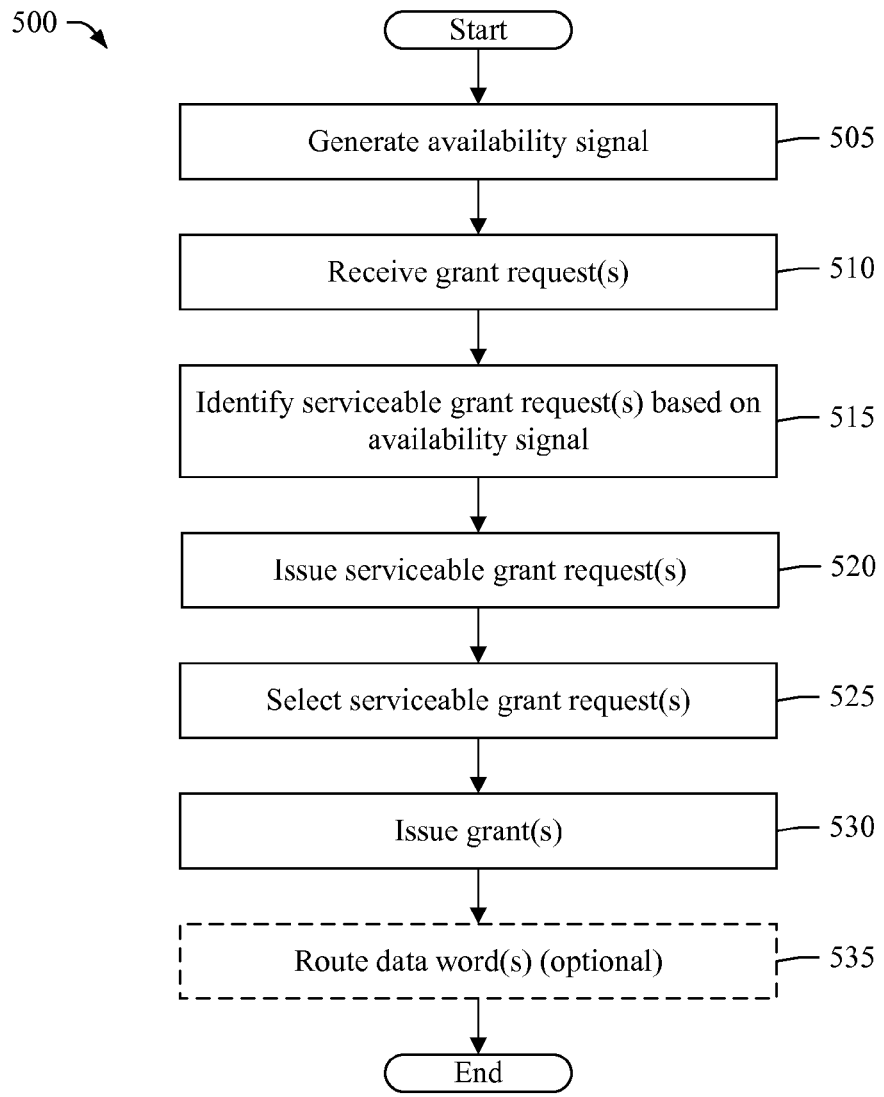
FIG. 5 is a flow chart of a method for arbitration in a packet switch, in accordance with an embodiment of the present invention.

FIG. 5 illustrates a method 500 for arbitration in the packet switch 100, in accordance with an embodiment of the present invention. In step 505, the arbiter 120 generates, in a current clock cycle, an availability signal identifying which pseudo-ports are available in a subsequent clock cycle. The method 500 then proceeds to step 510.

In step 510, the grant request filter(s) 115 receive grant request(s) from the input port(s) 110. Each grant request identifies a pseudo-port and the input port 110 corresponding to the grant request filter 115 that received the grant request. The method 500 then proceeds to step 515.

In step 515, the grant request filter(s) 115 identify serviceable grant request(s) based on the availability signal. In various embodiments, each grant request filter 115 can identify a grant request as a serviceable grant request based on the availability signal and any outstanding packet grant issued by the grant request filter 115 (e.g., a packet grant that has not been relinquished). In one embodiment, the grant request filter 115 determines whether the grant request is serviceable by identifying a pseudo-port identifier in the grant request and identifying an availability indicator in the availability signal based on the pseudo-port identifier. The grant request filter 115 then determines whether the pseudo-port is available based on the availability indicator. If the pseudo-port is available, the grant request filter 115 determines the grant request is serviceable. The method 500 then proceeds to step 520.

In step 520, the grant request filter(s) 115 issue the serviceable grant request(s) to the arbiter 120. In this process, each grant request filter 115 that identifies a serviceable grant request issues the serviceable grant request to the arbiter 120. The method 500 then proceeds to step 525.

In step 525, the arbiter 120 selects serviceable grant request(s). The arbiter 120 can select the serviceable grant request(s) based on a selection algorithm. For example, the arbiter 120 can select the serviceable grant request(s) based on a round robin algorithm. The method 500 then proceeds to step 530.

In step 530, the arbiter 120 issues a grant to each input port 110 that issued a selected grant request and to the grant request filter 115 corresponding to the input port 110. The method 500 then proceeds to step 535.

In optional step 535, the switch 135 routes data word(s) from each input port 110 that issued a selected grant request to each output port 125 of the pseudo-port identified by the selected grant request. Each output port 125 of the pseudo-port can then store the data word(s) in an output buffer 130 of the output port 125. Also in step 535, the output port 125 can transmit a data word stored in the output port 125 to a destination (not shown). The method 500 then ends. In an alternative embodiment, the method 500 returns to step 505 after step 535.

In other embodiments, the steps 505-535 of the method 500 may be performed in a different order. For example, the step may 510 may be performed before the step 505. In various embodiments, some of the steps 505-535 may be performed in parallel with each other. For example, the steps 505 and 510 may be performed in parallel. In some embodiments, the steps 505-535 may be performed at substantially the same time. For example, steps 505 and 510 may be performed substantially simultaneously.

In various embodiments, pseudo-ports may identify characteristics of a data packet. For example, a characteristic of a pseudo-port may be a type, length, or protocol of a data packet, or other information contained in a data packet. In some embodiments, pseudo-ports may identify characteristics of a source device or a destination device of the packet switch 100. For example, the destination device may include a digital signal processor (DSP), and a characteristic of the pseudo-port may be a characteristic of a memory structure in the digital signal processor. In this way, the packet switch 100 can be tailored for the memory structure of the digital signal processor. Other examples of source and destination devices are found in U.S. patent application Ser. No. 11/383,165, filed May 12, 2006, entitled "Packet Processing in a Packet Switch with Improved Output Data Distribution," which is incorporated herein by reference in its entirety. Further, the output ports 125 may have the same characteristics of the pseudo-ports for storing data. In some embodiments, the packet switch 100 may be a data switch that routes data not contained in data packets. For example, the packet switch 100 may be a node of an interconnect network.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for arbitration in a packet switch comprising a first plurality of input ports a first plurality of output ports, an arbitrator and a plurality of grant request filters, each of the plurality of grant request filters associated with one of each of the plurality of input ports, the method comprising:

receiving a data packet at a first input port of the first plurality of input ports of the packet switch;

issuing a grant request from the first input port to a first grant filter associated with the first input port in a first clock cycle, the grant request issued in response to the data packet received at the first input port, the grant request identifying a first pseudo-port of a plurality of pseudo-ports;

generating an availability signal at an arbiter in a first clock cycle, the arbiter generating the availability signal without receiving the grant request from the first input port identifying the first pseudo-port of the plurality of pseudo-ports, the availability signal including an availability indicator for each pseudo-port of the plurality of pseudo-ports, wherein each pseudo-port identifies a second plurality of output ports in the first plurality of output ports of the packet switch, each availability indicator for each pseudo-port indicating whether or not the pseudo-port will be available to receive data from any input port of the first plurality of input ports in a second clock cycle, wherein the second clock cycle follows the first clock cycle;

receiving the grant request issued from the first input port and the availability signal at the first grant request filter associated with the first input port;

determining whether or not the grant request received at the first grant request filter is a serviceable grant request, wherein the grant request is identified as being a serviceable grant request if the first pseudo-port identified by the grant request will be available to receive data in the second clock cycle, and wherein the first pseudo-port is available to receive data in the second clock cycle if the availability signal indicates that each output port of the second plurality of output ports of the packet switch is available to receive data in the second clock cycle; and issuing the grant request from the first grant request filter to the arbiter only if the grant request is determined to be a serviceable grant request.

2. The method of claim 1 further comprising, after issuing the serviceable grant request to the arbiter, routing data from the first input port to each output port of the first pseudo-port in the second clock cycle.

3. The method of claim 1, further comprising:
issuing a grant to the first grant request filter in response to the serviceable grant request after issuing the grant request to the arbiter;
issuing a packet grant from the grant request filter to the arbiter in response to the grant;
routing each data word of the data packet from the first input port to each output port of the first pseudo-port, each output port comprising a plurality of output buffers; and
issuing a stop packet grant from the grant request filter to the arbiter after the data packet is routed to each of the plurality of output buffers of the first pseudo-port.

4. The method of claim 3, wherein routing each data word of the data packet from the first input port to each output port of the first pseudo-port comprises routing a first data word of the data packet to each output buffer of the first pseudo-port in the second clock cycle.

5. The method of claim 1, wherein the pseudo-port identifies a priority, and wherein each output port of the pseudo-port is available to receive data in the second clock cycle if the output port is available to receive data having the priority in the second clock cycle.

6. The method of claim 1, wherein each output port identified by the pseudo-port comprises a plurality of output buffers each having a priority, and wherein each output port identified by the first pseudo-port is available to receive data having the priority in the second clock cycle if an output buffer having the priority in the output port is available to receive data in the second clock cycle.

7. The method of claim 1, further comprising:
determining a priority ranking for the serviceable grant request; and
selecting the serviceable grant request if the serviceable grant request has a highest priority.

8. The method of claim 1, wherein the availability signal is an availability vector indicating whether each pseudo-port of the plurality of pseudo-ports is available.

9. A system for arbitration in a packet switch comprising a first plurality of input ports and a first plurality of output ports, the system comprising:
a first input port of the first plurality of input ports configured to generate a grant request in a first clock cycle, the grant request identifying a first pseudo-port of a plurality of pseudo-ports;
an arbiter configured to generate in a first clock cycle an availability signal, the arbiter generating the availability signal without receiving the grant request from the first input port identifying the first pseudo-port of the plurality of pseudo-ports, the availability signal including an availability indicator for each pseudo-port of the plurality of pseudo-ports, wherein each pseudo-port identifies a second plurality of output ports in the first plurality of output ports of the packet switch, each availability indicator for each pseudo-port indicating whether or not the pseudo-port will be available to receive data from any input port of the first plurality of input ports in a second clock cycle, wherein the second clock cycle follows the first clock cycle; and at least one grant request filter coupled to the arbiter, the at least one grant request filter configured to receive the grant request from the first one of the first plurality of input ports and the availability signal from the arbiter, the at least one grant request filter configured to determine whether or not the grant request received at the at least one grant request filter is a serviceable grant request, wherein the grant request is identified as a serviceable grant request if the first pseudo-port identified by the grant request will be available to receive data in the second clock cycle, and wherein the first pseudo-port is available to receive data in the second clock cycle if the availability signal indicates that each output port of the second plurality of output ports of the packet switch is available to receive data in the second clock cycle, and the at least one grant request filter configured to issue the grant request from the at least one grant request filter to the arbiter only if the grant request is determined to be a serviceable grant request.

10. The system of claim 9, further comprising a switch configured to route data from the first input port to each of the second plurality of output ports in the second clock cycle.

11. The system of claim 10, wherein the first pseudo-port identifies a priority, and wherein each output port of the first pseudo-port is available to receive data in the second clock cycle if the output port is available to receive data having the priority in the second clock cycle.

12. The system of claim 9, wherein the arbiter is further configured to issue a grant in response to the serviceable grant request, and the at least one grant request filter is further configured to issue a packet grant to the arbiter in response to the grant.

13. The system of claim 12, further comprising a switch coupled to the first plurality of input ports and the first plurality of output ports, the switch configured to route each data word of a first data packet from the first input port to the each output port of the first pseudo-port, wherein the at least one grant request filter is further configured to issue a stop packet grant to the arbiter after the first data packet is routed to each output port of the first pseudo-port.

14. The system of claim 9, wherein the first pseudo-port identifies a priority, and wherein each output port of the first pseudo-port is available to receive data in the second clock cycle if the output port is available to receive data having the priority in the second clock cycle.

15. The system of claim 9, wherein each output port identified by the first pseudo-port comprises a plurality of output buffers each having a priority, and wherein each output port identified by the first pseudo-port is available to receive data having the priority in the second clock cycle if an output buffer having the priority in the output port is available to receive data in the second clock cycle.

16. The system of claim 9, wherein the arbiter is further configured to determine a priority ranking for each of a plurality of serviceable grant requests received from the at least one grant request filter and to select one of the serviceable grant requests having a highest priority.

17. The system of claim 9, wherein the arbiter is further configured to generate an availability vector indicating whether each pseudo-port of the plurality of pseudo-ports is available.

18. A packet switch comprising:

a plurality of input ports each configured to issue a grant request, the grant request identifying the input port issuing the grant request and a pseudo-port of a plurality of pseudo-ports;

a plurality of output ports each configured to generate a status signal indicating whether the output port is available to receive data;

an arbitration system coupled to the plurality of input ports and the plurality of output ports, the arbitration system comprising:

an arbiter configured to generate an availability vector based on the status signals generated by the plurality of output ports, the arbiter generating the availability vector without receiving the grant request from the input port issuing the grant request identifying the pseudo-port of the plurality of pseudo-ports, the availability vector comprising a plurality of availability bits associated with a corresponding plurality of pseudo-ports, each pseudo-port of the plurality of pseudo-ports identifying at least two ports in the plurality of output ports, each bit of the availability vector indicating whether the output ports identified by the corresponding pseudo-port are available to receive data from any input port of the plurality of input ports; and a grant request filter coupled to the arbiter and configured to receive the grant request identifying the input port issuing the grant request and the pseudo-port of the plurality of pseudo-ports, to identify the grant request as a serviceable grant request based on the availability vector, and to issue the grant request to the arbiter only if the grant request is identified to be a serviceable grant request, the arbiter further configured to select the serviceable grant request and to issue a grant to the input port identified by the grant request; and a switch coupled to the plurality of input ports and the plurality of output ports, the switch configured to route data of a data packet from the input port identified by the serviceable grant request to each output port of the pseudo-port identified by the serviceable grant request.

\* \* \* \* \*